United States Patent
Ashida

(10) Patent No.: US 8,395,359 B2
(45) Date of Patent: Mar. 12, 2013

(54) CHARGE CONTROLLER

(75) Inventor: Keiichi Ashida, Amagasaki (JP)

(73) Assignee: Ricoh Company, Ltd., Tokyo (JP)

(*) Notice: Subject to any disclaimer, the term of this patent is extended or adjusted under 35 U.S.C. 154(b) by 372 days.

(21) Appl. No.: 12/874,830

(22) Filed: Sep. 2, 2010

(65) Prior Publication Data

US 2011/0057625 A1    Mar. 10, 2011

(30) Foreign Application Priority Data

Sep. 10, 2009  (JP) .................................. 2009-209485

(51) Int. Cl.
*H01M 10/46* (2006.01)

(52) U.S. Cl. ........................................................ 320/162

(58) Field of Classification Search .................. 320/107, 320/128, 137, 157, 162
See application file for complete search history.

(56) References Cited

U.S. PATENT DOCUMENTS 7,449,862 B1 * 11/2008 Voor et al. ..................... 320/107
2008/0258688 A1 * 10/2008 Hussain et al. ............... 320/145

FOREIGN PATENT DOCUMENTS

| JP | 2004-166498 | 6/2004 |
| JP | 2005-50055 | 2/2005 |
| JP | 2006-191796 | 7/2006 |

* cited by examiner

*Primary Examiner* — Edward Tso
(74) *Attorney, Agent, or Firm* — Cooper & Dunham LLP

(57) ABSTRACT

A charge controller includes a power supply circuit and a battery charge circuit. The power supply circuit converts the input voltage into an output voltage for supply to the load at the output terminal. The power supply circuit includes an output current detection circuit and an output current limiting circuit. The output current detection circuit detects an output current supplied through the power supply circuit. The output current limiting circuit limits the output current below a maximum output current limit. The battery charge circuit derives power from the power supply circuit to charge a secondary battery. The battery charge circuit includes a charge current detection circuit and a charge current setting circuit. The charge current detection circuit detects a charge current supplied to the secondary battery. The charge current setting circuit regulates the charge current to a set current value.

8 Claims, 3 Drawing Sheets

CHARGE CONTROLLER

BACKGROUND OF THE INVENTION

1. Technical Field

The present invention relates to a charge controller for rechargeable, secondary batteries, and more particularly, to a charge controller that can effectively manage electricity from a power source of limited current capacity to charge a secondary battery while supplying power to load circuitry.

2. Discussion of the Background

Rechargeable, secondary batteries are commonly employed in portable electronic devices, such as laptop computers and cellular phones. Typically, battery-powered electronic equipment includes charge control circuitry that simultaneously charges the secondary battery and supplies power to load circuitry whenever the device is connected to an external power source, for example, an AC adapter. A problem encountered by the charge controller is that it fails to supply the secondary battery with a sufficient current when the electronic device is in use and consumes power, where the external power source has a limited maximum current output capacity equivalent to, or slightly greater than, a maximum rated current of the load circuitry.

To address this problem, various techniques have been proposed to provide an effective charge control circuit that can adjust a charge current depending on a load current being supplied to the load circuit.

For example, one conventional method provides a charge control circuit that draws power from a current-limited, constant voltage AC adapter for supplying a charge current and a load current, which varies with the operating state of load circuitry. According to this method, the charge control circuit can maximize the charge current to an extent that does not cause the output voltage of the AC adapter to fall below a minimum allowable limit. In particular, the charge control circuit can maintain the sum of the charge current and the load current within a range with which the AC adapter can supply power at a constant voltage.

Another conventional method provides a charge control circuit that draws power from a current-limited power source. According to this method, the control circuit can adjust a charge current based on a difference between a measured load current and a programmed charge current, so as to maintain the sum of the load current and the charge current within a maximum current limit for the current-limited power source.

These conventional methods have several drawbacks due to the operating principle that the sum of the load current and the charge current always matches the maximum current limit of the AC adapter.

One common drawback is that the charge control circuit has substantially no tolerance for excessive current where the current rating of the AC adapter is relatively small. That is, a significant decline in the output voltage of the AC adapter can occur to cause malfunctioning of the device, when the load current increases so rapidly that the circuit fails to cancel the increase in the load current by reducing the charge current.

Another common drawback is that the charge current can become significantly large to exceed a rated maximum limit of the secondary battery where the current rating of the AC adapter itself is relatively large.

In addition to those drawbacks that may result when the secondary battery is in a normal operating state, still another drawback can also occur where the battery is in an abnormal state, e.g., over-discharged or overheated. An over-discharged or overheated secondary battery is required to be charged with a current sufficiently smaller than normal, since charging with a large current can reduce the life of the battery in the abnormal condition. However, the conventional circuit cannot adjust the charge current depending on the operating condition of the battery, and thus has the risk of damaging the battery during charge.

BRIEF SUMMARY

This disclosure describes an improved charge controller.

In one aspect of the disclosure, the charge controller includes a power supply circuit and a battery charge circuit. The power supply circuit has an input terminal thereof connected to an input voltage and an output terminal thereof connected to a load, and converts the input voltage into an output voltage for supply to the load at the output terminal. The power supply circuit includes an output current detection circuit and an output current limiting circuit. The output current detection circuit detects an output current supplied through the power supply circuit. The output current limiting circuit limits the output current below a maximum output current limit. The battery charge circuit has an input terminal thereof connected to the output terminal of the power supply circuit and an output terminal thereof connected to a secondary battery, and derives power from the power supply circuit to charge the secondary battery. The battery charge circuit includes a charge current detection circuit and a charge current setting circuit. The charge current detection circuit detects a charge current supplied to the secondary battery. The charge current setting circuit is connected to the output current detection circuit and the charge current detection circuit, and regulates the charge current to a set current value. The set current value is determined based on the detected output current and the detected charge current as given by:

$$I < Ilim + I2 - I1$$

wherein "I" represents the set current value, "Ilim" representing a control parameter, "I1" represents the detected output current, and "I2" represents the detected charge current.

In another aspect of the disclosure, the charge controller includes a power supply circuit and a battery charge circuit. The power supply circuit has an input terminal thereof connected to an input voltage and an output terminal thereof connected to a load, and converts the input voltage into an output voltage for supply to the load at the output terminal. The power supply circuit includes an output current detection circuit and an output current limiting circuit. The output current detection circuit detects an output current supplied through the power supply circuit. The output current limiting circuit limits the output current below a maximum output current limit. The battery charge circuit has an input terminal thereof connected to the output terminal of the power supply circuit and an output terminal thereof connected to a secondary battery, and derives power from the power supply circuit to charge the secondary battery. The battery charge circuit includes a charge current detection circuit and a charge current setting circuit. The charge current detection circuit detects a charge current supplied to the secondary battery. The charge current setting circuit is connected to the output current detection circuit and the charge current detection circuit, and regulates the charge current to a smaller one of a maximum charge current limit determined based on an externally supplied signal and a set current value. The set current value is determined based on the detected output current and the detected charge current as given by:

$$I = Ilim + I2 - I1$$

wherein "I" represents the set current value, "Ilim" representing a control parameter, "I1" represents the detected output current, and "i1" represents the detected charge current.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF EXEMPLARY EMBODIMENTS

Figure 1:
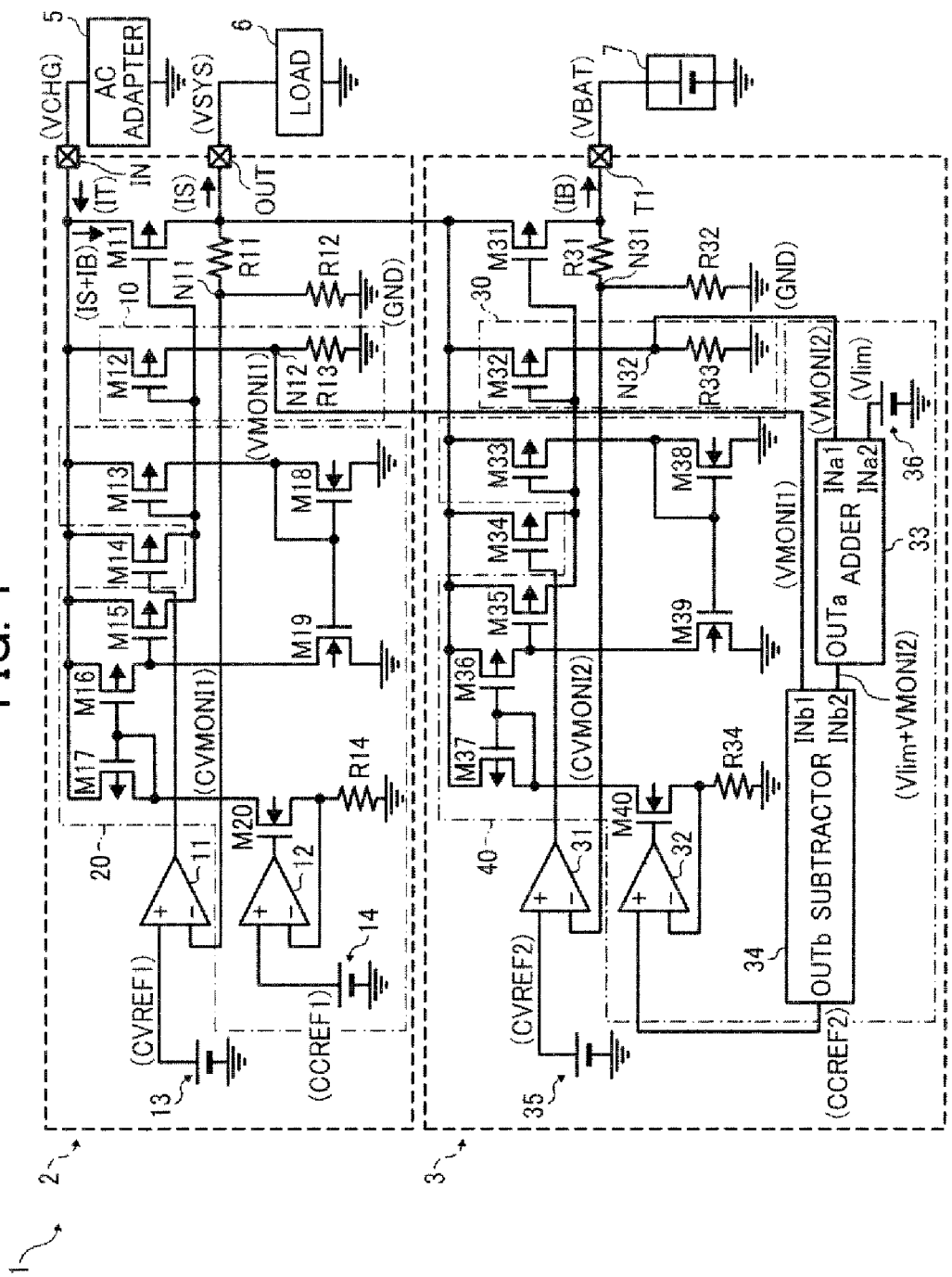
FIG. 1 is a circuit diagram schematically illustrating a charge controller according to a first embodiment of this patent specification.

In describing exemplary embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views, examples and exemplary embodiments of this disclosure are described.

FIG. 1 is a circuit diagram schematically illustrating a charge controller 1 according to one embodiment of this patent specification.

As shown in FIG. 1, the charge controller 1 includes a power supply circuit 2 and a battery charge circuit 3. The power supply circuit 2 has an input terminal IN connected to an AC adapter 5, and an output terminal OUT connected to a load circuit 6. The battery charge circuit 3 has an input terminal connected to the output terminal OUT of the power supply circuit 2 and an output terminal T1 connected to a rechargeable, secondary battery 7.

In the charge controller 1, the power supply circuit 2 comprises a series voltage regulator that converts an input voltage VCHG input to the input terminal IN from the AC adapter 5 to generate a constant output voltage VSYS for supply to the load circuit 6 at the output terminal OUT.

Specifically, the power supply circuit 2 includes a pair of operational amplifiers 11 and 12, a primary reference voltage generator 13 generating a first primary reference voltage CVREF1, a secondary reference voltage generator 14 generating a first secondary reference voltage CCREF1, and first through fourth resistors R11 through R14, as well as first through seventh transistors M11 through M17 each being a p-channel metal-oxide semiconductor (PMOS) device with gate, source, and drain terminals, and eighth through tenth transistors M18 through M20 each being an n-channel metal-oxide semiconductor (NMOS) device with gate, source, and drain terminals.

In the power supply circuit 2, the first transistor M11, the first and second resistors R11 and R12, the primary reference voltage generator 13, the operational amplifier 11, and the fourth transistors M11 together form a regulation stage of the voltage regulator.

In the regulation stage, the first, PMOS transistor M11 has its source terminal connected to the input terminal IN and its drain terminal connected to the output terminal OUT. The resistors R11 and R12 are connected in series between the output terminal OUT and ground GND to together form a voltage divider that divides the output voltage VSYS into a proportional, feedback voltage CVMONI1 at a feedback node N11 therebetween.

The operational amplifier 11 has a non-inverting input connected to the reference voltage generator 13 to receive the primary reference voltage CVREF1, an inverting input connected to the feedback node N11 to receive the feedback voltage CVMONI1, and an output connected to the gate terminal of the fourth transistor M14. The fourth, PMOS transistor M14 is connected between the input terminal IN and the gate of the first transistor M11.

The second transistor M12 and the third resistor R13 together form an output current detection circuit 10.

In the output current detection circuit 10, the second, PMOS transistor M12 and the resistor R13 are connected in series between the input terminal IN and ground GND to generate a voltage signal VMONI1 at an output current detection node N12 therebetween.

The third transistor M13 and the fifth through tenth transistors M15 through M20, as well as the operational amplifier 12, the reference voltage generator 14, and the resistor R14 together form an output current limiting circuit 20.

In the output current limiting circuit 20, the third, PMOS transistor M13 has its source terminal connected to the input terminal IN, its drain terminal connected to the drain terminal of the eighth transistor M18, and its gate terminal connected to the gate terminal of the first transistor M11. The fifth, PMOS transistor M15 is connected, in parallel with the fourth transistor M14, between the input terminal IN and the gate of the first transistor M11.

The tenth, NMOS transistor M20 has its drain terminal connected to the drain terminal of the seventh transistor M17 and its source terminal connected to ground GND through the fourth resistor R14. The operational amplifier 12 has a non-inverting input connected to the reference voltage generator 14 to receive the secondary reference voltage CCREF1, an inverting input connected to the source terminal of the tenth transistor M20, and an output connected to the gate terminal of the tenth transistor M20.

The sixth and seventh, PMOS transistors M16 and M17 have their source terminals connected together to the input terminal IN, and their gate terminals connected together to the drain terminal of the seventh transistor M17 to together form a current mirror circuit that mirrors or replicates a drain current of one transistor to generate a drain current of the other. The eighth and ninth, NMOS transistors M18 and M19 have their source terminals grounded together, and their gate terminals connected together to the drain terminal of the eighth transistor M18 to together form a current mirror circuit. The drain terminals of the sixth and ninth transistors M16 and M19 are connected together to the gate terminal of the fifth transistor M15.

With continued reference to FIG. 1, the battery charge circuit 3 derives power from the power supply circuit 2 to charge the secondary battery 7 with a charge current IB at a battery voltage VBAT. The battery charge circuit 3 has a configuration similar to that of the power supply circuit 2 described above, including a pair of operational amplifiers 31 and 32, first through fourth resistors R31 through R34, first through seventh, PMOS transistors M31 through M37, eighth through tenth, NMOS transistors M38 through M40, and a reference voltage generator 35 generating a second primary reference voltage CVREF2, except that the circuit 3 includes a control signal generator 36 generating a control signal Vlim, an adder 33, and a subtractor 34, instead of the secondary reference voltage generator 14.

Specifically, in the battery charge circuit 3, the first transistor M31, the first and second resistors R31 and R32, the primary reference voltage generator 33, the operational amplifier 31, and the fourth transistors M31 together form a regulation stage of the voltage regulator.

In the regulation stage, the first, PMOS transistor M31 has its source terminal connected to the output terminal OUT of the power supply circuit 3 and its drain terminal connected to the battery terminal T1. The resistors R31 and R32 are connected in series between the battery terminal T1 and ground GND to together form a voltage divider that divides the battery voltage VBAT into a proportional, feedback voltage CVMONI2 at a feedback node N31 therebetween.

The operational amplifier 31 has a non-inverting input connected to the reference voltage generator 35 to receive the primary reference voltage CVREF2, an inverting input connected to the feedback node N31 to receive the feedback voltage CVMONI2, and an output connected to the gate terminal of the fourth transistor M34. The fourth, PMOS transistor M34 is connected between the output terminal OUT and the gate of the first transistor M31.

The second transistor M32 and the third resistor R33 together form a charge current detection circuit 30.

In the charge current detection circuit 30, the second, PMOS transistor M32 and the resistor R33 are connected in series between the output terminal OUT and ground GND to generate a voltage signal VMONI2 at a charge current detection node N32 therebetween.

The third transistor M33 and the fifth through tenth transistors M35 through M40, the operational amplifier 32, the resistor R34, the adder 33, the subtractor 34, and the control signal generator 36 together form a charge current setting circuit 40.

In the charge current setting circuit 40, the third, PMOS transistor M33 has its source terminal connected to the output terminal OUT, its drain terminal connected to the drain terminal of the eighth transistor M38, and its gate terminal connected to the gate terminal of the first transistor M31. The fifth, PMOS transistor M35 is connected, in parallel with the fourth transistor M34, between the output terminal OUT and the gate of the first transistor M31.

The adder 33 has a first input terminal INa1 connected to the charge current detection node N32 between the second transistor M32 and the third resistor R33 to receive the charge current detection signal VMONI2, a second input terminal INa2 connected to the control signal generator 36 to receive the control signal Vlim, and an output terminal OUTa to output a signal Vlim+VMONI2 indicating a sum of the input signals VMONI2 and Vlim.

The subtractor 34 has a first input terminal INb1 connected to the output current detection node N12 between the second transistor M12 and the third resistor R13 to receive the output current detection signal VMONI1, a second input terminal INb2 connected to the adder output terminal OUTa to receive the signal Vlim+VMONI2, and an output terminal OUTb to output a variable, secondary reference voltage CCREF2 indicating a difference between the input signals Vlim+VMONI2 and VMONI1.

The tenth, NMOS transistor M40 has its drain terminal connected to the drain terminal of the seventh transistor M37 and its source terminal connected to ground GND through the fourth resistor R34.

The operational amplifier 32 has a non-inverting input connected to the output terminal OUTb of the subtractor 34 to receive the secondary reference voltage CCREF2, an inverting input connected to the source terminal of the tenth transistor M40, and an output connected to the gate terminal of the tenth transistor M40.

The sixth and seventh, PMOS transistors M36 and M37 have their source terminals connected together to the output terminal OUT, and their gate terminals connected together to the drain terminal of the seventh transistor M37 to together form a current mirror circuit. The eighth and ninth, NMOS transistors M38 and M39 have their source terminals grounded together, and their gate terminals connected together to the drain terminal of the eighth transistor M38 to together form a current mirror circuit. The drain terminals of the sixth and ninth transistors M36 and M39 are connected together to the gate terminal of the fifth transistor M35.

During operation, the power supply circuit 2 regulates the output voltage VSYS through the regulation stage and supplies an output current IS+IB through the drain of the first transistor M11 (i.e., the sum of a load current IS supplied to the load circuit 6 and a charge current IB supplied to the secondary battery 7). At the same time, the output current detection circuit 10 monitors or detects the output current IS+IB for transmission to the battery charge circuit 3. The output current limiting circuit 20 limits the output current IS+IB below a rated, maximum current limit I1max of the power supply circuit 2.

Specifically, in the regulation stage of the power supply circuit 2, the operational amplifier 11 controls the gate of the fourth transistor M14 so as to maintain the feedback voltage CVMONI1 equal to the primary reference voltage CVREF1. This in turn controls the first transistor M11 to maintain the output voltage VSYS at a given constant level, as long as the drain current IS+IB of the transistor M11 remains below the maximum current limit I1max.

In the output current limiting circuit 20, the operational amplifier 12 controls the gate of the tenth transistor M20 so as to maintain the source voltage of the transistor M20 equal to the secondary reference voltage CCREF1. This in turn maintains the drain current of the transistor M20 at a constant value CCREF1/r14 obtained by dividing the source voltage CCREF1 of the transistor M20 by a value r14 of the resistor R14.

The constant current CCREF1/r14 thus generated flows into the current mirror formed by the transistors M16 and M17, which causes a replicated copy of the incoming current CCREF1/r14 to flow through the drain of the sixth transistor M16. This drain current of the sixth transistor M16 flows to the drain of the ninth transistor M19.

On the other hand, the third transistor M13, with its source connected to the source of the transistor M11 and its gate connected to the gate of the transistor M11, conducts a current substantially proportional to the drain current IS+IB of the first transistor M11. This drain current of the third transistor M13 flows to the drain of the eighth transistor M18.

The current mirror formed by the transistors M18 and M19 maintains the drain current of the eighth transistor M18 equal to that of the ninth transistor M19 by changing the drain voltage of the ninth transistor M19. The current mirror thus controls the gate voltage, hence the resistance, of the fifth transistor M15 connected between the source and gate of the first transistor M11, which eventually changes the gate voltage of the first transistor M11 to adjust the drain current IS+IB.

In a condition where the output current IS+IB remains below the maximum current limit I1max, the drain voltage of the ninth transistor M19 is high and close to the input voltage VCHG of the current supply circuit 2, so that the fifth transistor M15 remains off. With the transistor M15 shut off, the gate voltage of the first transistor M11 as well as that of the third transistor M13 are controlled by the fourth transistor M14 through the voltage regulation stage described above, wherein the operational amplifier 11 comparing the voltage feedback signal CVMONI1 against the reference voltage CVREF1 controls the gate of the fourth transistor M14 so as to maintain the output voltage VSYS at a constant level.

Where the output current IS+IB increases toward the maximum current limit I1max, the increase in the drain current IS+IB of the first transistor M11 results in a corresponding increase in the drain current of the third transistor M13, which means an increase in the drain current of the eighth transistor M18. As the drain current of the eighth transistor M18 exceeds the drain current of the ninth transistor M19, the current mirror circuit reduces the drain voltage of the transistor M19. This results in a reduction in the gate voltage of the fifth transistor M15, which reduces the transistor ON-resistance to eventually reduce the gate voltage of the first transistor M11.

Such a feedback control maintains the drain current IS+IB of the first transistor M11 below the maximum current limit I1max which is substantially proportional to the drain current of the tenth transistor M20. The maximum current limit I1max thus dictates a maximum amount of current that the power supply circuit 2 can supply. In the present embodiment, the maximum current limit I1max is approximately 1000 times greater than the drain current of the tenth transistor M20.

In the output current detection circuit 10, the second transistor M12, with its source connected to the source of the transistor M11 and its gate connected to the gate of the transistor M11, conducts a drain current substantially proportional to the drain current IS+IB of the first transistor M11. The drain current of the second transistor M12 flows to the resistor R13, which converts the incoming current into a voltage signal VMONI1 at the detection node N12 which indicates the magnitude of the output current IS+IB being supplied. The detection signal VMONI1 thus generated is forwarded to the charge current setting circuit 40 of the battery charge circuit 3.

With continued reference to FIG. 1, the battery charge circuit 3 operates in a manner similar to that of the power supply circuit 2 depicted above.

Specifically, the battery charge circuit 3 regulates the battery voltage VBAT to a constant level through the regulation stage. At the same time, the charge current detection circuit 30 monitors or detects the charge current IB for output to the charge current setting circuit 40. The charge current setting circuit 40 regulates the charge current IB to a set current value I determined based on the detected output current IS+IB and the detected charge current IB.

Where the voltage VBAT of the secondary battery 7 is relatively small so that the feedback voltage CVMONI2 generated through the voltage divider resistors R31 and R32 dividing the battery voltage VBAT remains below the primary reference voltage CVREF2, the battery charge circuit 3 supplies the battery 7 with a constant charge current substantially proportional to the drain current CCREF2/r34 of the tenth transistor M40 obtained by dividing the secondary reference voltage CCREF2 by a resistance r34 of the resistor R34.

As the secondary battery 7 is sufficiently charged, the battery voltage VBAT increases so that the feedback voltage CVMONI2 reaches the primary reference voltage CVREF2, upon which the battery voltage VBAT is regulated to a constant voltage determined by the voltage CVREF2 and the values of the resistors R31 and R32. At this point, the battery charge circuit 3 supplies the battery 7 with a charge current smaller than that supplied for a relatively small battery voltage.

More specifically, in the current setting circuit 40, the adder 33 receives the voltage signal VMONI2 at the first input INa1 and the control signal Vlim at the second input INa2. The adder 33 adds the input signals VMONI2 and Vlim to output a resulting voltage Vlim+VMONI2 to the output terminal OUTa.

The subtractor 34 receives the voltage signal VMONI1 at the first input INb1 and the adder output signal Vlim+VMONI2 at the second input INa2. The subtractor 34 subtracts the first input signal VMONI1 from the second input signal Vlim+VMONI2 to output the secondary reference voltage CCREF2 as given by the following Equation 1:

$$CCREF2 = Vlim + VMONI2 - VMONI1$$

In the present embodiment, the control signal Vlim is a voltage slightly smaller than a voltage VMONI1 obtained where the maximum limit I1max of the output current IS+IB is reached. The control signal Vlim thus represents a control parameter Ilim indicating magnitude of current slightly smaller than (e.g., approximately 95% of) the maximum current limit I1max.

On the other hand, the voltage signal VMONI1 is generated at the output current detection node N12 by converting the drain current of the second transistor M12, which is proportional to the drain current IS+IB of the first transistor M11. The voltage signal VMONI2 is generated at the charge current detection node N32 by converting the drain current of the second transistor M32, which is proportional to the drain current IB of the first transistor M31.

The voltages VMONI2 and VMONI1 thus represent the magnitudes of the output current IS+IB and the charge current IB, respectively, detected in the charge controller 1. Hence, the polynomial VMONI2−VMONI1 in Equation 1 gives a negative value the magnitude of which is substantially proportional to that of the load current IS.

Accordingly, applying the secondary reference voltage CCREF2 obtained by Equation 1 to the charge current setting circuit 40 results in the charge current IB regulated to the set current value I determined by the control current Ilim plus the detected charge current IB minus the detected output current IS+IB, or the control current Ilim minus the load current IS. Constantly supplying the battery 7 with the regulated current IB maintains the sum of the load current IS and the charge current IB below the maximum current limit I1max of the power supply circuit 2.

Thus, the charge controller 1 according to this patent specification can maintain the sum of the load current IS and the charge current IB below the maximum current limit I1max of the power supply circuit 2. Such current regulation capability allows the power supply circuit 2 to stably supply a constant voltage to the load circuit 6 without causing a rapid decrease in the output voltage VSYS even where the load current IS is abruptly increased.

Further, the charge controller 1 according to this patent specification allows the power supply circuit 2 to supply the load circuit 6 with the rated maximum current I1max by reducing the charge current IB to 0 where the load current IS exceeds the control current Ilim determined by the control signal Vlim.

Figure 2:
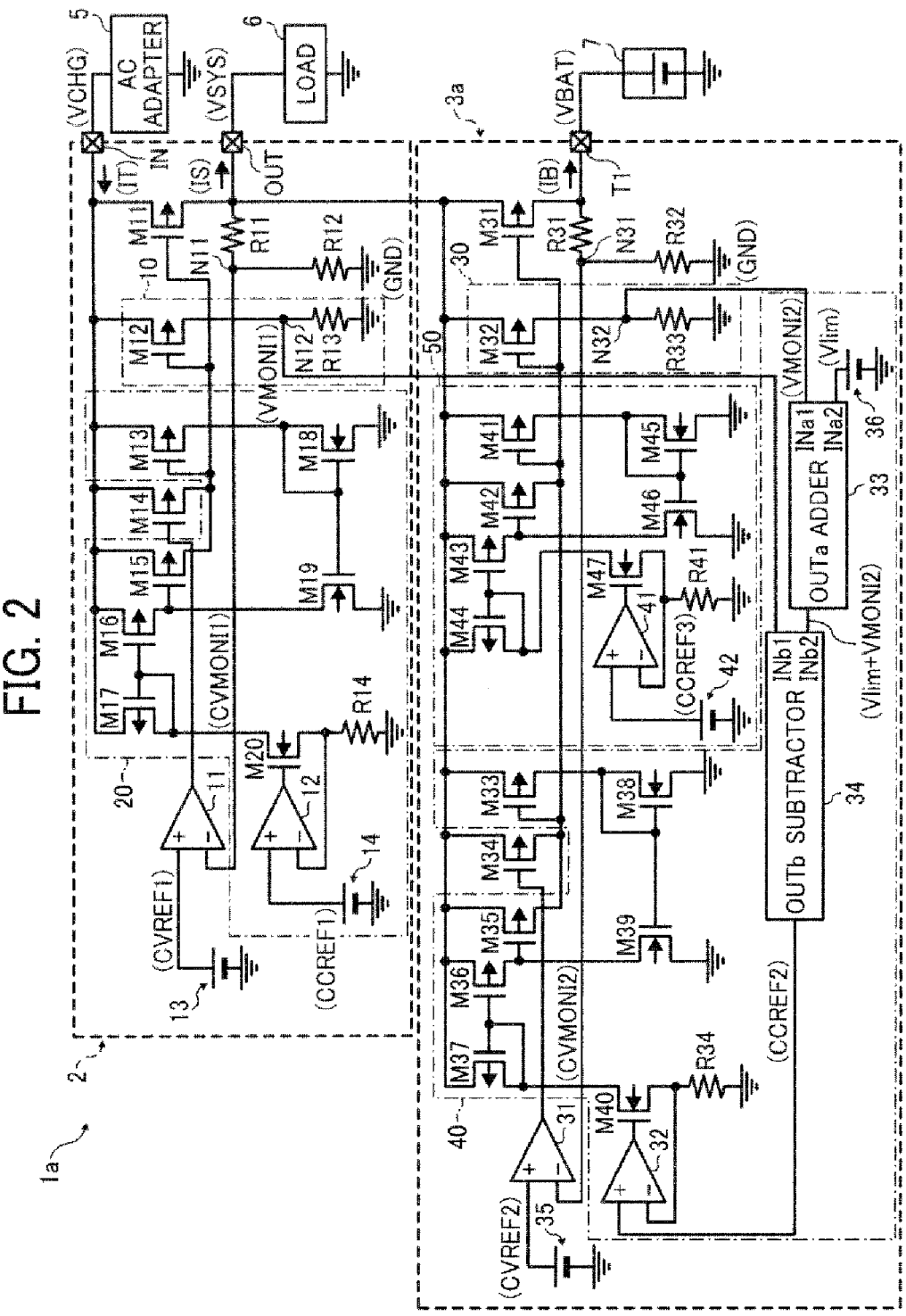
FIG. 2 is a circuit diagram schematically illustrating the charge controller according to a second embodiment of this patent specification.

FIG. 2 is a circuit diagram schematically illustrating a charge controller 1a according to a second embodiment of this patent specification.

As shown in FIG. 2, the overall configuration of the charge controller 1a is similar to that depicted in FIG. 1, including a power supply circuit 2 with an input terminal IN connected to an AC adapter 5, and an output terminal OUT connected to a load circuit 6, as well as a battery charge circuit 3a with an input terminal connected to the output terminal OUT and an output terminal T1 connected to a rechargeable, secondary battery 7.

The power supply circuit 2 comprises a series voltage regulator that converts an input voltage VCHG input to the input terminal IN from the AC adapter 5 to generate a constant output voltage VSYS for supply to the load circuit 6 at the output terminal OUT. The battery charge circuit 3a derives power from the power supply circuit 2 to charge the secondary battery 7 with a charge current IB at a battery voltage VBAT.

Unlike the first embodiment, the second embodiment has the battery charge circuit 3a provided with a charge current limiting circuit 50 similar to the output current limiting circuit 20 depicted above, including an operational amplifier 41, a reference voltage generator 42 generating a third secondary reference voltage CCREF3, PMOS transistors M41 through M44, NMOS transistors M45 through M47, and a resistor R41.

Specifically, in the charge current limiting circuit 50, the PMOS transistor M41 has its source terminal connected to the output terminal OUT or voltage VSYS, its drain terminal connected to the drain terminal of the NMOS transistor M45, and its gate terminal connected to the gate terminal of the first transistor M31. The PMOS transistor M42 has its source terminal connected to the output terminal OUT and its drain terminal connected to the gate terminal of the first transistor M31.

The NMOS transistor M47 has its drain terminal connected to the drain terminal of the PMOS transistor M44, and its source terminal connected to ground GND through the resistor R41. The operational amplifier 41 has a non-inverting input connected to the reference voltage generator 42 to receive the secondary reference voltage CCREF3, an inverting input connected to the source terminal of the NMOS transistor M47, and an output connected to the gate terminal of the NMOS transistor M47.

The PMOS transistors M43 and M44 have their source terminals connected together to the output terminal OUT, and their gate terminals connected together to the drain terminal of the transistor M44 to together form a current mirror circuit. The NMOS transistors M45 and M46 have their source terminals grounded together, and their gate terminals connected together to the drain terminal of the eighth transistor M18 to together form a current mirror circuit. The drain terminals of the transistors M43 and M46 are connected together to the gate terminal of the transistor M42.

During operation, the charge current limiting circuit 50 serves to limit the charge current IB below a maximum charge current limit I2max at which the secondary battery 7 is properly charged, which is proportional to a constant current CCREF3/r41 obtained by dividing the reference voltage CCREF3 by a value r41 of the resistor R41. Provision of the charge current limiting circuit 50 in addition to the charge current setting circuit 40 allows the charge circuit 3a to set the charge current IB to the smaller of the maximum current limit I2max and the set current value I.

Hence, in addition to the current regulation capability depicted above, the charge controller 1a according to this patent specification can maintain the charge current IB below the maximum current limit I2max. Such additional current limiting capability ensures the secondary battery 7 is properly charged with an appropriate current regardless of the rated current limit of the power supply circuit 2, which allows for greater flexibility in selecting a current rating for the power supply circuit 2.

Figure 3:
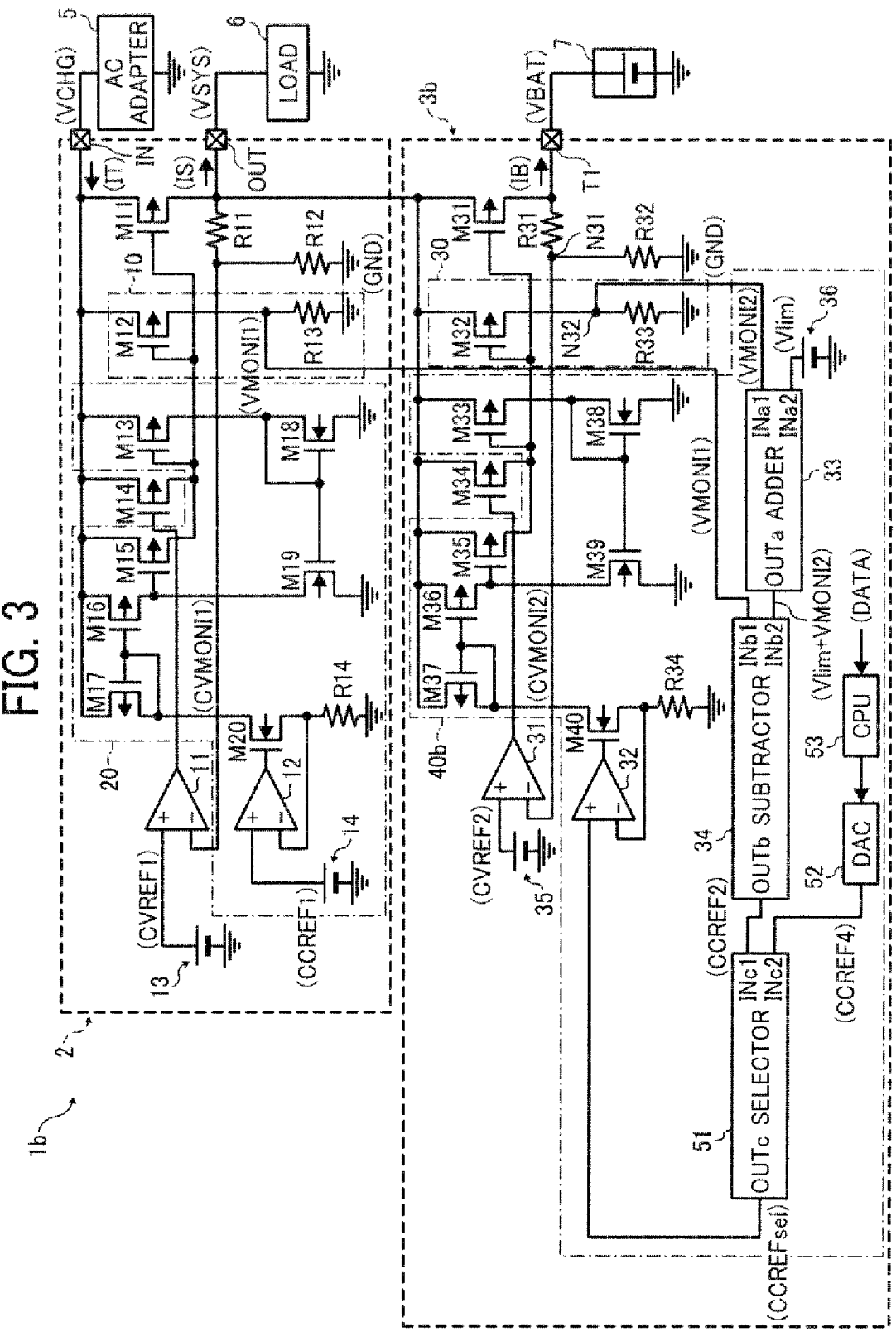
FIG. 3 is a circuit diagram schematically illustrating the charge controller according to a third embodiment of this patent specification.

FIG. 3 is a circuit diagram schematically illustrating a charge controller 1b according to a third embodiment of this patent specification.

As shown in FIG. 3, the overall configuration of the charge controller 1b is similar to that depicted in FIG. 1, including a power supply circuit 2 with an input terminal IN connected to an AC adapter 5 and an output terminal OUT connected to a load circuit 6, as well as a battery charge circuit 3b with an input terminal connected to the output terminal OUT and an output terminal T1 connected to a rechargeable, secondary battery 7.

The power supply circuit 2 comprises a series voltage regulator that converts an input voltage VCHG input to the input terminal IN from the AC adapter 5 to generate a constant output voltage VSYS for supply to the load circuit 6 at the output terminal OUT. The battery charge circuit 3b derives power from the power supply circuit 2 to charge the secondary battery 7 with a charge current IB at a battery voltage VBAT.

Unlike the first embodiment, the third embodiment has the battery charge circuit 3b provided with a selector 51, a digital-to-analog converter (DAC) 52, and a central processing unit (CPU) 53, which, together with the third and fifth through tenth transistors M33, M35, M36, M37, M38, M39, and M40, the resistor M34, the operational amplifier 32, the adder 33, the subtractor 34, and the control signal generator 36, form a charge current setting circuit 40b.

Specifically, in the charge current setting circuit 40b, the adder 33 adds the control signal Vlim and the charge current detection signal VMONI2 to output the resulting signal Vlim+VMONI2 to the subtractor 34, which subtracts the output current detection signal VMONI1 from the input signal Vlim+VMONI2 to output the secondary reference signal CCREF2 representing the set current value I dependent on the load current IS. The generated reference signal CCREF2 is input to an input terminal INc1 of the selector 51.

On the other hand, the CPU 53 is connected to a signal source, not shown, which provides the CPU 53 with a data signal DATA indicating properties and/or conditions of the secondary battery 7 in use, such as battery type, operating voltage, operating temperature, etc. The CPU 53 processes the battery data signal DATA to generate a digital signal representing a maximum charge current limit I2max with which the secondary battery 7 in use can be properly charged. The digital signal thus generated is output to the DAC 52, which converts the incoming signal into an analog voltage signal CCREF4. The generated reference signal CCREF4 is input to another input terminal INc2 of the selector 51.

Of the two reference voltage signals CCREF2 and the CCREF4, the selector 51 selects that which can cause the charge current IB to be lower than that possible with the other. That is, where the set charge current I is greater than the maximum current limit I2max, the charge circuit 3b charges the battery 7 with maximum current limit I2max. Conversely, where the charge current setting I is smaller than the maximum current limit I2max, the charge circuit 3b charges the battery 7 with the set current value I.

Hence, in addition to the current regulation capability depicted above, the charge controller 1b according to this patent specification can change the charge current level depending on the operating state of the secondary battery 7 in use. Such variable current setting capability enables the charge circuit 3b to supply the battery 7 with a sufficiently small charge current IB for safe pre-charge in case of over-discharge, or for preventing deterioration in case of overheat.

Although the charge controller 1b depicted above is obtained by arranging the first embodiment with the addition of the selector 51, the DAC 52, and the CPU 53, a similar addition may be made to the second embodiment with the charge current limiting circuit, in which case the reference voltage CCREF4 may be input to the non-inverting input of the operational amplifier 41 in place of the reference voltage CCREF3. In any such embodiments, the charge controller according to this specification can provide a good current setting capability as in the embodiment depicted above.

Numerous additional modifications and variations are possible in light of the above teachings. It is therefore to be understood that within the scope of the appended claims, the disclosure of this patent specification may be practiced otherwise than as specifically described herein.

This patent specification is based on Japanese patent application No. 2009-209485 filed on Sep. 10, 2009 in the Japanese Patent Office, the entire contents of which are hereby incorporated by reference herein.

What is claimed is:

1. A charge controller comprising:
a power supply circuit having an input terminal thereof connected to an input voltage and an output terminal thereof connected to a load, which converts the input voltage into an output voltage for supply to the load at the output terminal,
the power supply circuit including:
an output current detection circuit to detect an output current supplied through the power supply circuit; and
an output current limiting circuit to limit the output current below a maximum output current limit; and
a battery charge circuit having an input terminal thereof connected to the output terminal of the power supply circuit and an output terminal thereof connected to a secondary battery, which derives power from the power supply circuit to charge the secondary battery,
the battery charge circuit including:
a charge current detection circuit to detect a charge current supplied to the secondary battery; and
a charge current setting circuit connected to the output current detection circuit and the charge current detection circuit to regulate the charge current to a set current value determined based on the detected output current and the detected charge current as given by:

$I < Ilim + I2 - I1$ wherein "I" represents the set current value, "Ilim" representing a control parameter, "I1" represents the detected output current, and "I2" represents the detected charge current.

2. The charge controller according to claim 1, wherein the charge circuit further includes a charge current limiting circuit that limits the charge current below a maximum charge current limit.

3. The charge controller according to claim 2, wherein the maximum charge current limit is determined based on an externally supplied signal.

4. The charge controller according to claim 3, wherein the externally supplied signal comprises data representing at least one of type, operating voltage, and operating temperature of the secondary battery in use.

5. The charge controller according to claim 1, wherein the control parameter does not exceed the maximum output current limit.

6. A charge controller comprising:
a power supply circuit having an input terminal thereof connected to a power source and an output terminal thereof connected to a load, which converts an input voltage input to the input terminal to output an output voltage to the output terminal for supplying the load,
the power supply circuit including:
an output current detection circuit to detect an output current supplied through the power supply circuit; and
an output current limiting circuit to limit the output current below a maximum output current limit; and
a battery charge circuit having an input terminal thereof connected to the output terminal of the power supply circuit and an output terminal thereof connected to a secondary battery, which derives power from the power supply circuit to charge the secondary battery,
the battery charge circuit including:
a charge current detection circuit to detect a charge current supplied to the secondary battery; and
a charge current setting circuit connected to the output current detection circuit and the charge current detection circuit to regulate the charge current to the smaller of a maximum charge current limit determined based on an externally supplied signal and a set current value determined based on the detected output current and the detected charge current,
the set current value being given by:

$I = Ilim + I2 - I1$ wherein "I" represents the set current value, "Ilim" represents a control parameter, "I1" represents the detected output current, and "I2" represents the detected charge current.

7. The charge controller according to claim 6, wherein the externally supplied signal comprises data representing at least one of type, operating voltage, and operating temperature of the secondary battery in use.

8. The charge controller according to claim 6, wherein the control parameter does not exceed the maximum output current limit.

* * * * *